(12) United States Patent
Zhang et al.

(10) Patent No.: US 12,369,202 B2
(45) Date of Patent: Jul. 22, 2025

(54) DATA PROCESSING METHOD AND APPARATUS, RELATED DEVICE, AND STORAGE MEDIUM

(71) Applicant: TENCENT TECHNOLOGY (SHENZHEN) COMPANY LIMITED, Shenzhen (CN)

(72) Inventors: Peng Zhang, Shenzhen (CN); Jian Li, Shenzhen (CN); Xiaofeng Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 307 days.

(21) Appl. No.: 17/965,109

(22) Filed: Oct. 13, 2022

(65) Prior Publication Data
US 2023/0031062 A1 Feb. 2, 2023

Related U.S. Application Data

(63) Continuation of application No. PCT/CN2021/126230, filed on Oct. 26, 2021.

(30) Foreign Application Priority Data

Nov. 10, 2020 (CN) .......................... 202011246040.6

(51) Int. Cl.
*H04W 76/10* (2018.01)
*H04L 61/2514* (2022.01)

(52) U.S. Cl.
CPC ......... *H04W 76/10* (2018.02); *H04L 61/2514* (2013.01)

(58) Field of Classification Search
CPC .................... H04W 76/10; H04L 61/2514
See application file for complete search history.

(56) References Cited

U.S. PATENT DOCUMENTS 6,079,020 A * 6/2000 Liu .................. H04L 41/22
709/223
6,415,329 B1 * 7/2002 Gelman ............ H04L 69/163
709/245

(Continued)

FOREIGN PATENT DOCUMENTS

CN 109951562 A 6/2019
CN 111193813 A 5/2020

(Continued)

OTHER PUBLICATIONS

The Japan Patent Office (JPO) Notification of Reasons for Refusal for Application No. 2023-518856 and Translation Mar. 11, 2024 10 Pages.

(Continued)

*Primary Examiner* — Brenda H Pham
(74) *Attorney, Agent, or Firm* — ANOVA LAW GROUP, PLLC

(57) ABSTRACT

A data processing method includes: receiving a connection test packet transmitted by a first client; determining an access address of a second client contained in the connection test packet, and storing the access address of the second client; and transmitting, when a first address storage notification message transmitted by a second gateway is received while receiving a connection data packet transmitted by the first client to the second client, the connection data packet to the second client through the second gateway, so as to establish a communication connection between the first client and the second client according to the connection data packet.

20 Claims, 9 Drawing Sheets

(56) References Cited

U.S. PATENT DOCUMENTS

| | | | |
|---|---|---|---|
| 2003/0212795 A1 | 11/2003 | Harris et al. | |
| 2005/0144289 A1* | 6/2005 | Yoshiuchi | H04L 67/14 709/227 |
| 2012/0331154 A1 | 12/2012 | Sunderrajan | |
| 2017/0208032 A1 | 7/2017 | Cox | |
| 2020/0092400 A1* | 3/2020 | Bonaventure | H04L 69/16 |

FOREIGN PATENT DOCUMENTS

| | | |
|---|---|---|
| CN | 111314498 A | 6/2020 |
| CN | 112073540 A | 12/2020 |
| JP | 2005525750 A | 8/2005 |
| WO | 03096653 A1 | 11/2003 |
| WO | 2018017011 A1 | 1/2018 |

OTHER PUBLICATIONS

The World Intellectual Property Organization (WIPO) International Search Report for PCT/CN2021/126230 Jan. 5, 2022 7 Pages (including translation).

European Patent Office European Search Report for Application No. 21890952.1 Apr. 21, 2023 11 pages.

Zhang Yamei et al: " Research on using UDP to traverse NAT under P2P network environment", Advanced Computer Theory and Engineering, 2010 3rd International Conference On, IEEE, Piscataway, NJ, USA, Aug. 20, 2010.

* cited by examiner

DATA PROCESSING METHOD AND APPARATUS, RELATED DEVICE, AND STORAGE MEDIUM

CROSS-REFERENCES TO RELATED APPLICATIONS

This application is a continuation application of PCT Patent Application No. PCT/CN2021/126230, entitled "DATA PROCESSING METHOD AND APPARATUS, RELATED DEVICE AND STORAGE MEDIUM" and filed on Oct. 26, 2021, which claims priority to Chinese Patent Application No. 202011246040.6, entitled "DATA PROCESSING METHOD AND APPARATUS, RELATED DEVICE, AND STORAGE MEDIUM" filed with the China National Intellectual Property Administration on Nov. 10, 2020, the entire contents of both of which are incorporated herein by reference.

FIELD OF THE TECHNOLOGY

The present disclosure relates to the field of computer technology, and particularly to data processing.

BACKGROUND OF THE DISCLOSURE

Peer-to-peer (or point-to-point) (P2P) transmission refers to implementing transmission between two clients in different private networks. Because the clients are in different private networks, transmission between the two clients in different private networks depends on a public network. That is, when the clients in different private networks need to transmit data, the public network is needed to forward the data. In order to improve the efficiency of peer-to-peer transmission, a hole punching technology may be used to directly connect clients in different private networks. However, the success rate of a current hole punching technology in connecting two clients in different private networks is relatively low. Therefore, how to improve the success rate of communication connection between clients in different private networks becomes a hot research topic nowadays.

SUMMARY

Embodiments of the present disclosure provide a data processing method and apparatus, a related device, and a storage medium, which may improve the success rate of establishing a communication connection between clients in private networks.

In an aspect, the embodiments of the present disclosure provide a data processing method, including: receiving a connection test packet transmitted by a first client, the connection test packet containing an access address of a second client, the first client belonging to a first private network provided with the first gateway, the second client belonging to a second private network with a second gateway; storing the access address of the second client contained in the connection test packet; receiving a connection data packet transmitted by the first client to the second client; checking whether a first address storage notification message transmitted by the second gateway is received, the first address storage notification message being transmitted by the second gateway after storing an access address of the first client; and in response to determining that the first address storage notification message is received, transmitting the connection data packet to the second client through the second gateway, the connection data packet being used to establish a communication connection between the first client and the second client.

In a further aspect, the embodiments of the present disclosure provide a data processing method, including: transmitting a connection test packet to a first gateway, the connection test packet containing an access address of a second client, such that the first gateway stores the access address of the second client according to the connection test packet, a first client belonging to a first private network with the first gateway, the second client belonging to a second private network provided with a second gateway; checking whether an address storage notification message transmitted by the second gateway is received, the address storage notification message being transmitted by the second gateway after storing an access address of the first client; and transmitting a connection data packet for the second client to the first gateway when determining that the address storage notification message is received, such that the first gateway transmits the connection data packet to the second client through the second gateway to establish a communication connection between the first client and the second client according to the connection data packet.

According to still another aspect, an embodiment of the present disclosure provides a gateway device, including a processor, an input device, an output device, and a memory, the processor, the input device, the output device, and the memory being connected to each other, the memory being configured to store a computer program, the computer program including a program instruction, the processor being configured to invoke the program instruction to perform the foregoing data processing method.

According to still another aspect, an embodiment of the present disclosure provides a terminal device, including a processor, an input device, an output device, and a memory, the processor, the input device, the output device, and the memory being connected to each other, the memory being configured to store a computer program, the computer program including a program instruction, the processor being configured to invoke the program instruction to perform the data processing method in the foregoing methods.

According to still another aspect, an embodiment of the present disclosure provides a non-transitory computer-readable storage medium. The computer-readable storage medium stores a computer program, the computer program being configured to perform the data processing method in the foregoing aspects.

According to yet another aspect, an embodiment of the present disclosure provides a computer program product including instructions, the computer program product, when run on a computer, causing the computer to perform the data processing method in the foregoing aspects.

In the embodiments of the present disclosure, the first gateway may receive, when determining that it is necessary to establish a communication connection between the first client and the second client, a connection test packet transmitted by the first client, so as to store an access address of the second client based on a packet header file of the connection test packet. Further, the first gateway may transmit a connection data packet of the first client to the second client through the second gateway when determining that the second gateway already stores an access address of the first client, so as to establish the communication connection between the first client and the second client based on the connection data packet. Since the first gateway and the second gateway already prestore the access addresses of the correspondent clients, the connection data packet may be forwarded smoothly through the first gateway and the second gateway, and further, the communication connection may be established between the first client and the second client. Since the probability that the connection data packet is dropped by the first gateway or the second gateway is relatively low, the success rate of establishing the communication connection between the first client and the second client may be improved.

DESCRIPTION OF EMBODIMENTS

Figure 1A:
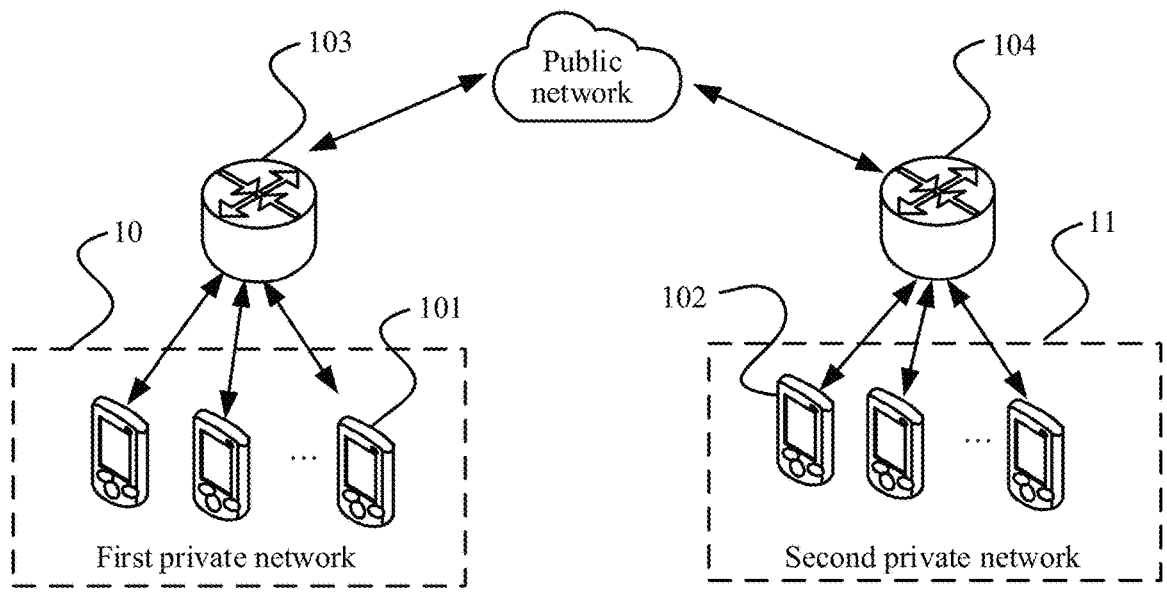
FIG. 1a is a diagram of a system architecture for a data processing method according to an embodiment of the present disclosure.

In order to establish a communication connection between a first client and second client in different private networks and effectively improve the success rate of establishing the communication connection between the first client and the second client, the embodiments of the present disclosure disclose a data processing method. A first gateway corresponding to the first client and a second gateway corresponding to the second client may prestore access addresses of the correspondent clients respectively. As such, the first gateway and the second gateway may successfully forward, when acquiring connection data packets for instructing the establishment of the communication connection between the first client and the second client, the connection data packets based on the access addresses of the correspondent clients recorded in the first gateway and the second gateway. Therefore, the success rate of establishing the communication connection between the first client and the second client is improved. In an embodiment, a correspondent client is a client in different private networks with a local client. As shown in FIG. 1a, the first client may belong to a first private network marked as 10 in FIG. 1a, and the second client may belong to, for example, a second private network marked as 11 in FIG. 1a. The first client may be a client marked as 101 in the first private network 10, and the second client may be a client marked as 102 in the second private network 11. In an embodiment, the first client 101 may access a public network through a first gateway, and the second client 102 may access the public network through a second gateway. The first gateway may be, for example, a gateway marked as 103 in FIG. 1a, and the second gateway may be, for example, a gateway marked as 104 in FIG. 1a. It is to be noted that types of networks that the first gateway 103 and the second gateway 104 belong to are not specified. They may belong to the private networks, or the public network. No limits are made in the embodiments of the present disclosure. Each of the first gateway and the second gateway is an application programming interface (API) gateway. Therefore, the first gateway may also be referred to as a first interface gateway, and the second gateway may also be referred to as a second interface gateway.

In an embodiment, both the first gateway and the second gateway are extranet gateways. The extranet gateway is a gateway configured with a network address transport or network address translation (NAT) protocol. The network address translation protocol is used for mapping a client address of a client in a private network for access to the private network into an access address for public network access, translating, based on access information transmitted from the public network to the client in the private network, an access address corresponding to the access information into a corresponding private address (i.e., the client address), and forwarding the private address to the corresponding client, such that the client in the private network may interact with the public network based on the network address translation protocol deployed in the gateway. According to an address translation manner of NAT, the gateway deployed with the NAT protocol may be divided into full cone NAT, restricted cone NAT, port restricted cone NAT, symmetric NAT, and dynamic NAT. The data processing method disclosed in the embodiments of the present disclosure to establish the communication connection between the first client and second client in different private networks may be implemented when dynamic NAT is used for the first gateway corresponding to the first client and the second gateway corresponding to the second client. However, the embodiments of the present disclosure may also be used when the first gateway or the second gateway is not a gateway of a dynamic NAT type. Alternatively, when the first gateway or the second gateway is not a gateway of the dynamic NAT type, a backlink technology, or a birthday attack technology, or a port prediction technology may be used to establish the communication connection between the first client and the second client.

Figure 1B:
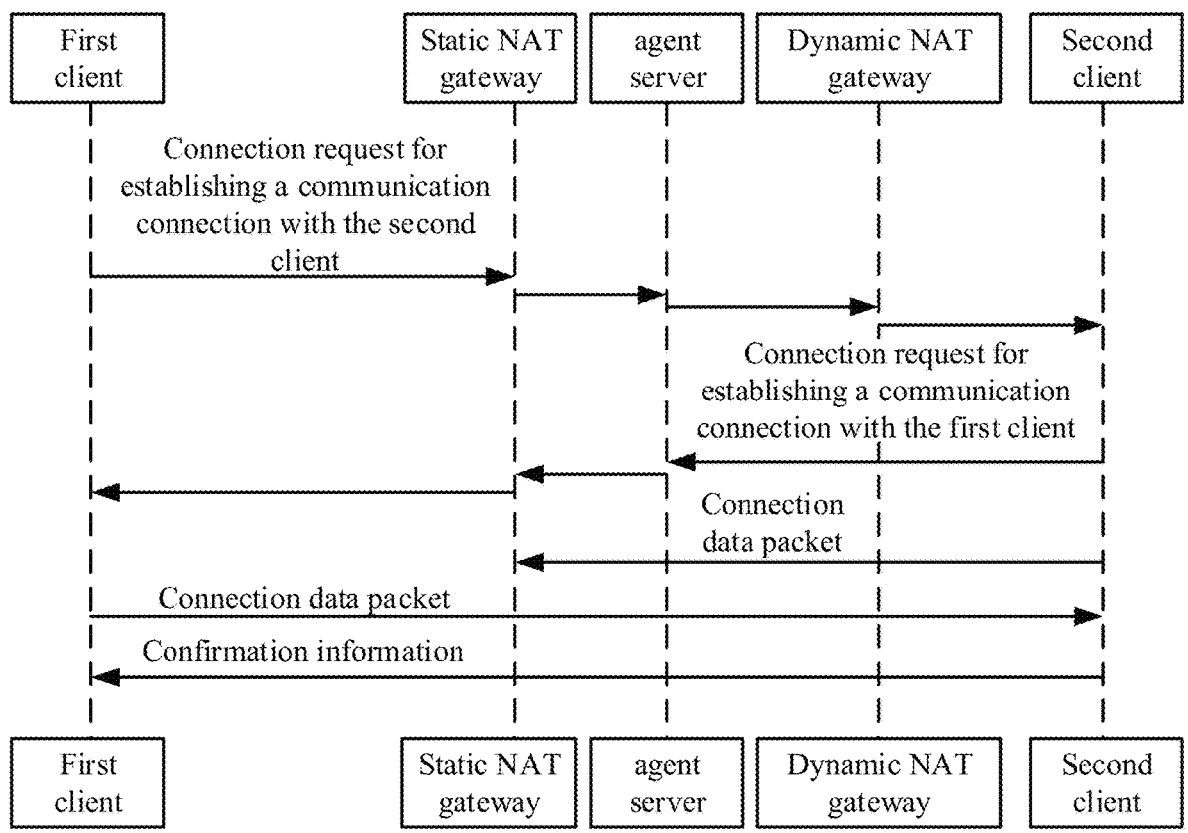
FIG. 1b is a schematic diagram of establishing a communication connection between a first client and a second client by hole punching.

In an embodiment, the backlink technology implements communication between the first client and the second client as follows: the first client and the second client correspond to different gateways deployed with NAT, the first client, if intended to communicate with the second client, may transmit a connection request to the second client through an agent server while transmitting a connection data packet to the access address of the second client, and the second client may transmit the connection data packet to the access address of the first client after receiving the connection request forwarded by the agent server. The birthday attack technology is mainly used for connection problems when NAT deployed in the corresponding gateways is port restricted NAT and symmetric NAT. Since an external port of symmetric NAT changes randomly, port restricted NAT needs to predict the external port of symmetric NAT and transmit packets to random ports of symmetric NAT, and symmetric NAT transmit packets to port restricted NAT using different sockets. The backlink technology is a technology that allows dynamic NAT to initiate hole punching actively. As shown in FIG. 1B, the following steps may be specifically included:

At s11, the first client transmits a connection request to the second client through the agent server.

At s12, the second client transmits a connection request to the first client through the agent server.

At s13, the second client transmits a connection data packet to the first client. The connection data packet may be dropped by the first gateway (static NAT gateway) corresponding to the first client because the first client yet does not communicate directly with the second client. In such case, the second gateway (dynamic NAT gateway) corresponding to the second client may record the access address of the first client.

At s14, the first client directly transmits a connection data packet to the second client. Since the second gateway corresponding to the second client records the access address of the first client, the connection data packet may pass through the second gateway. In such case, the first gateway corresponding to the first client records the access address of the second client.

At s15, the second client transmits, to the first client after receiving the connection data packet transmitted by the first client, confirmation information that may arrive at the first client through the gateway. As such, hole punching between the first client and the second client is implemented. Hole punching refers to creating a connection between clients in different private networks. The private network may be, for example, a transmission control protocol/Internet protocol (TCP/IP) network.

The backlink technology may implement hole punching for a dynamic NAT gateway and a static NAT gateway, so as to establish a communication connection between clients in different private networks. However, when NAT in the gateways corresponding to the first client and the second client is dynamic NAT, if the correspondent client is actively connected to the gateway deployed with dynamic NAT, NAT deployed in the gateway is manifested as cone NAT. Cone NAT maps an external port into a fixed port, such that the gateway deployed with dynamic NAT may successfully forward a communication message received from the public network to the correspondent client. If the correspondent client makes a request to be actively connected to the gateway deployed with dynamic NAT, NAT deployed in the gateway is manifested as dynamic NAT. Dynamic NAT maps an external port into a random port, such that the gateway deployed with dynamic NAT fails to successfully forward, after receiving a communication message (such as a connection data packet requesting for communication connection) transmitted by the correspondent client, the communication message to the corresponding client (or the success rate of forwarding the communication message to the corresponding client is relatively low). It can thus be seen that the gateway deployed with dynamic NAT may achieve a connection success only by actively initiating connection. The backlink technology implements communication connection between a client corresponding to a gateway deployed with dynamic NAT and a client corresponding to a gateway deployed with non-dynamic NAT by causing the gateway deployed with dynamic NAT to actively initiate connection. However, when NAT deployed in the gateways corresponding to the first client and the second client is dynamic NAT, active connection of the gateway corresponding to any client may make NAT in the gateway corresponding to the correspondent client dynamic NAT. As a result, the gateway corresponding to any client fails to correctly forward a connection data packet transmitted by the correspondent client through the gateway to request for communication connection, leading to a communication connection failure between the first client and the second client. That is, when NAT deployed in the gateways corresponding to the first client and the second client is dynamic NAT, it is difficult to implement communication between the first client and the second client.

Figure 1C:
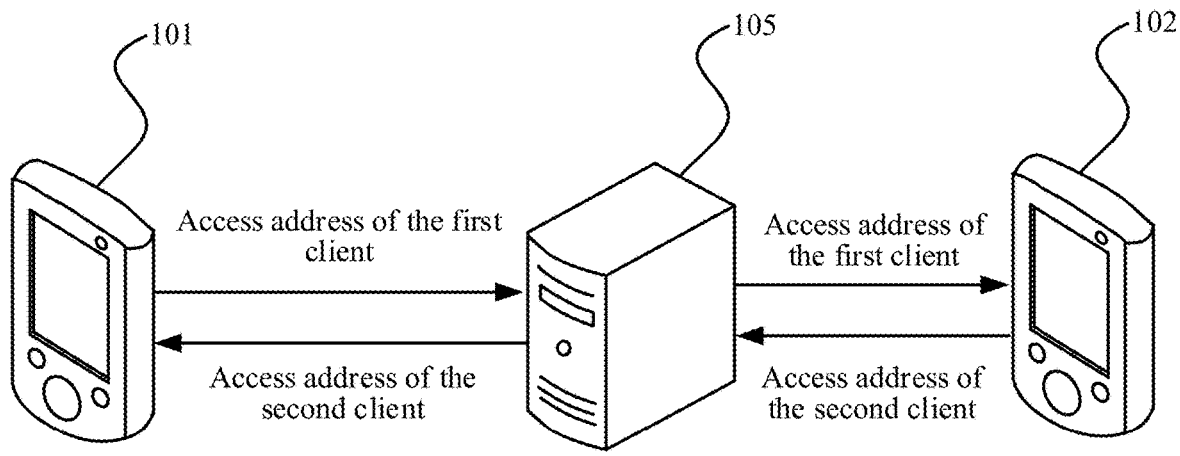
FIG. 1c is a schematic interaction diagram of a first client, a second client, and an agent server according to an embodiment of the present disclosure.

In order to solve the problem of intercommunication of two clients when NAT in gateways corresponding to the clients is dynamic NAT, the embodiments of the present disclosure disclose a data processing method. In the data processing method disclosed in the embodiments of the present disclosure, in order to establish a communication connection between a first client and a second client, the first client and the second client may transmit connection test packets with time to live (TTL) to their corresponding first gateway and second gateway respectively. The connection test packet records an access address of the correspondent client (i.e., an external access address of the correspondent client). Based on the time to live, the connection test packet just arrives at the gateway corresponding to the local client but not at the gateway corresponding to the correspondent client. In this manner, the access address of the correspondent client is recorded in the gateway corresponding to the local client. Therefore, the gateway deployed with dynamic NAT may correctly forward, after receiving a connection data packet from the correspondent client to request for a communication connection, the received connection data packet without mapping an external port into a random port to establish the communication connection between the first client and the second client. Specifically, the first client and the second client may first determine their access addresses for public network access respectively. Both the first client and the second client determine their access addresses for access to the public network using a network traversal protocol, such as a session traversal utilities for NAT (STUN) protocol. Since the first client and the second client belong to different private networks, the first client and the second client may not communicate directly. However, in order to enable the first client to transmit the access address of the first client to the second client and acquire the access address of the second client, the first client and the second client may transmit their own access addresses to each other through an agent server. A connection relationship between the first client, the second client, and the agent server is shown in FIG. 1c. The agent server is a server marked as 105 in FIG. 1c. In such case, the first client 101 transmits the access address of the first client to the second client 102 through the agent server 105 after determining the access address of the first client, and the second client 102 transmits the access address of the second client to the first client 101 through the agent server 105 after determining the access address of the second client. As such, the first client and the second client determine the access addresses of each other respectively.

After the first client and the second client determine the access addresses of each other respectively, the first client may transmit a connection test packet containing the access address of the second client to the first gateway. The first client may record source address information and destination address information in a packet header file of the connection test packet when transmitting the connection test packet containing the access address of the second client to the first gateway. The source address information is an intranet address (or client address) of the first client, and the destination address information is the access address of the second client. It can be understood that the access address of the second client is an extranet address of the second client for access to the public network through the second gateway, i.e., a gateway address of the second gateway. Therefore, the first gateway may determine, after receiving the connection test packet, the access address of the second client based on the source address information and destination address information recorded in the packet header file, and then store the access address of the second client. When the first gateway receives a connection data packet from the second gateway, since the gateway address of the second gateway (i.e., the access address of the second client) is already recorded in the first gateway, the first gateway successfully forwards the connection data packet to the first client based on the stored information after receiving the connection data packet from the second gateway.

Figure 1D:
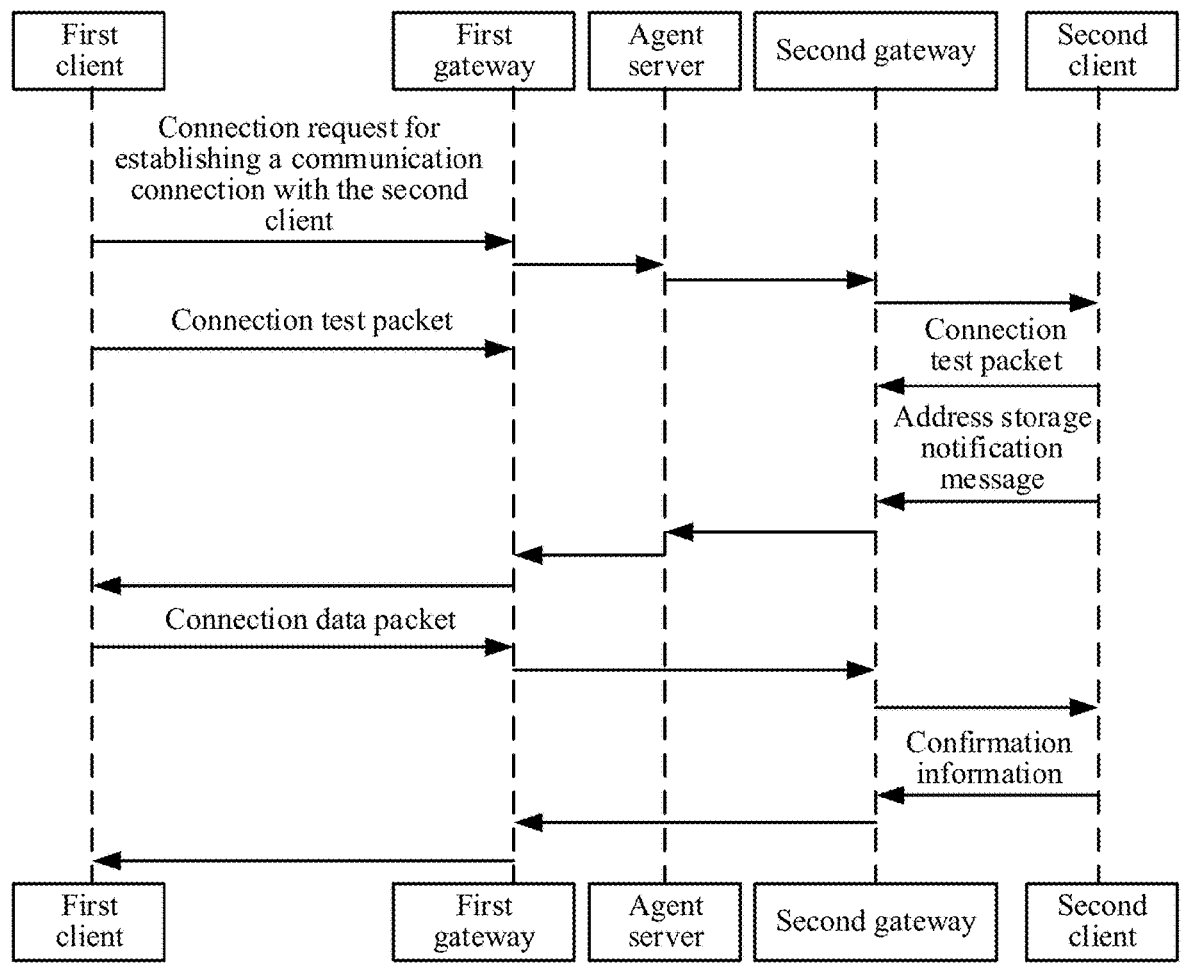
FIG. 1d is a schematic diagram of establishing a communication connection between a first client and a second client by hole punching according to an embodiment of the present disclosure.

Similarly, the second client may also transmit a connection test packet containing the access address of the first client to the second gateway, such that the second gateway stores source address information and destination address information recorded in a packet header file of the connection test packet, to store the access address of the first client. The second gateway may also successfully forward, when receiving a connection data packet from the first gateway, the connection data packet to the second client. In specific implementation, as shown in FIG. 1d, when the first gateway corresponding to the first client and the second gateway corresponding to the second client are both dynamic gateways, the communication connection is established between the first client and the second client specifically by the following steps:

At s21, the first client transmits a connection request for establishing a communication connection to the second client through the agent server.

At s22, the first client transmits a connection test packet to the second client at the same time. The connection test packet just arrives at the first gateway, and time to live of the connection test packet after arriving at the first gateway is 0. Therefore, the first gateway does not forward the connection test packet to the second client after receiving the connection test packet, and the second client may not receive the connection test packet. The first gateway records the access address of the second client contained in the connection test packet after receiving the connection test packet.

At s23, the second client may also transmit a connection test packet to the second gateway after receiving the connection request. The connection test packet also just arrives at the second gateway, and is not forwarded to the outside. The second gateway also records the access address of the first client contained in the connection test packet after receiving the connection test packet.

At s24, after the second client transmits the connection test packet to the second gateway, the dynamic second gateway is able to receive a data packet of the first client. Therefore, the second client may transmit an address storage notification message to the first client through the agent server to notify the first client (or the first gateway) that the second gateway already stores the access address of the first client.

At s25, the first client may transmit, to the second client after receiving the address storage notification message, a connection data packet that may arrive at the second client smoothly through the first gateway and the second gateway.

At s26, the second client may return confirmation information indicating successful reception to the first client after receiving the connection data packet transmitted by the first client. As such, the communication connection is established between the first client and the second client.

Figure 2:
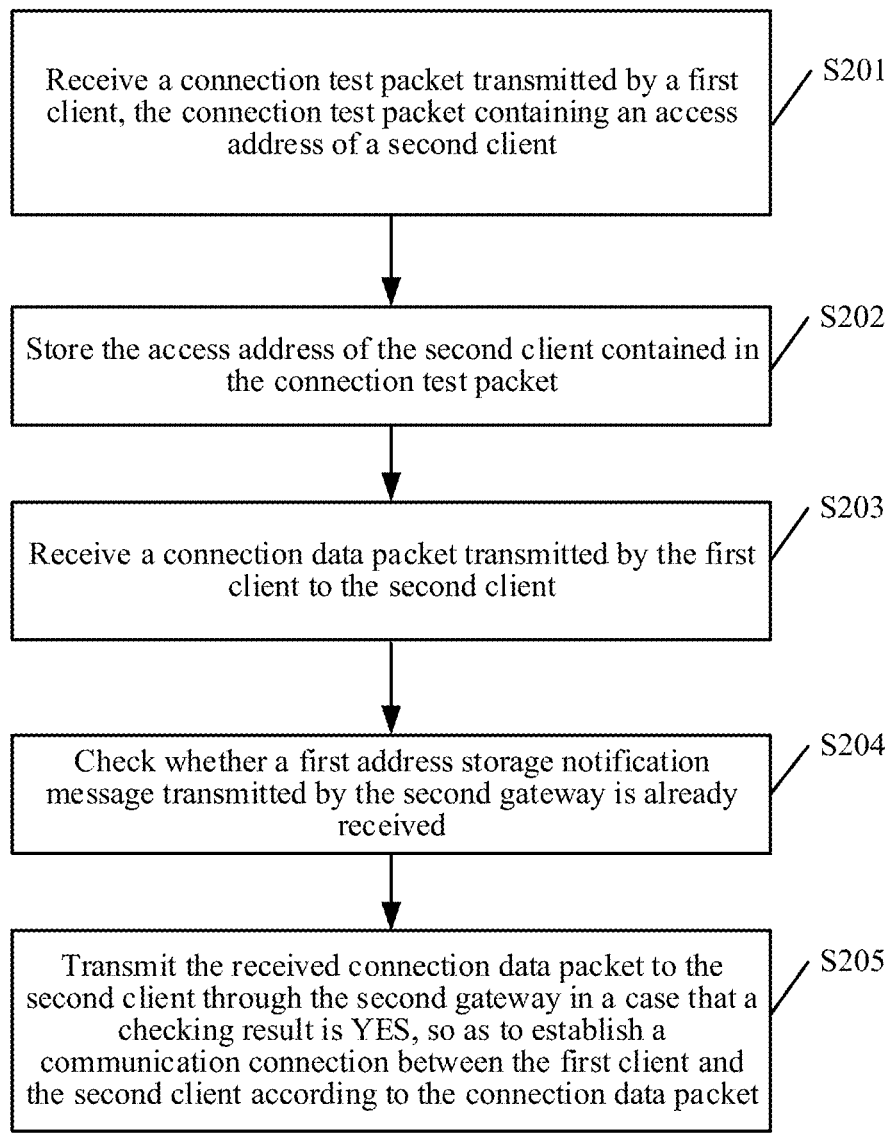
FIG. 2 is a schematic flowchart of a data processing method according to an embodiment of the present disclosure.

Referring to FIG. 2, FIG. 2 is a schematic flowchart of a data processing method according to an embodiment of the present disclosure. The method may be applied to a first gateway corresponding to the above-mentioned first client. As shown in FIG. 2, the method may include the following steps:

S201: Receive a connection test packet transmitted by a first client, the connection test packet containing an access address of a second client.

In an embodiment, the first client belongs to a first private network, the second client belongs to a second private network, the first private network is provided with the first gateway, the second private network is provided with a second gateway, and both the first gateway and the second gateway are extranet gateways. Each extranet gateway is deployed with a network address translation protocol, the network address translation protocol being used for translating a client address of a client for private network access into an access address for public network access. The first gateway translates a client address of the first client for access to the first private network into an access address of the first client when the first client accesses a public network. The second gateway translates a client address of the second client for access to the second private network into the access address of the second client when the second client accesses the public network. When it is necessary to establish a communication connection between the first client and the second client, the first gateway may first determine types of the network address translation protocols deployed in the first gateway and the second gateway respectively. The type of the network address translation protocol includes a dynamic type and a static type. A static network address translation protocol translates an intranet address (i.e., client address) into a fixed extranet access address, while a dynamic network address translation protocol may implement random mapping to different access addresses during address translation. Through the network address translation protocols, the first gateway and second gateway that serve as extranet gateways may accurately obtain by translation the access addresses of the first client and the second client for access to the public network, to lay a foundation for subsequent establishment of a data connection between the first client and the second client and improve the establishment success rate.

In an embodiment, the first client may first determine a first protocol type of the network address translation protocol in the first gateway and a second protocol type of the network address translation protocol in the second gateway. If both the first protocol type and the second protocol type are dynamic types, the step of receiving a connection test packet from a first client is triggered. However, this embodiment of the present disclosure may also be used when the first protocol type or the second protocol type is not a dynamic type. A protocol characteristic of a dynamic network address translation protocol includes that: if a gateway deployed with this network address translation protocol does not store an access address of a source client, after a connection data packet is received from the source client that is not stored, a mapped random port is used to forward the connection data packet, while forwarding based on random port mapping may bring the risk that the connection data packet is dropped, so hole punching between the first client and the second client may fail. In order to avoid a gateway deployed with a dynamic network address translation protocol (i.e., a dynamic NAT gateway) that receives a connection data packet dropping the connection data packet to implement correct forwarding of the received connection data packet, an access address of a correspondent client may be prestored in the gateway deployed with the dynamic network address translation protocol. If the gateway corresponding to the first client and the gateway corresponding to the second client are both gateways deployed with dynamic network address translation protocols, in order to ensure successful hole punching between the first client and the second client, storage of the access address of the second client in the first gateway and the access address of the first client in the second gateway may be implemented first to implement storage of the access addresses of the correspondent clients in the gateways deployed with the dynamic network address translation protocols. As such, the first gateway or the second gateway may forward, when receiving a connection data packet transmitted by the first client to the second client (or by the second client to the first client), the connection data packet to the correspondent client, to implement communication connection between the first client and the second client.

In an embodiment, in order to store the access address of the second client, after receiving the connection test packet containing the access address of the second client from the first client, the first gateway may determine the access address of the second client from the connection test packet, and store the access address of the second client. That is, S202 is executed. Similarly, it can be understood that the second gateway may also acquire a connection test packet containing the access address of the first client from the second client, determine the access address of the first client from the connection test packet, and store the access address of the first client. The access address of the second client is acquired in advance by the first client from an agent server. The access address of the second client acquired by the agent server is determined by the second client using a network traversal protocol (such as the above-mentioned STUN protocol). The first client generates the connection test packet containing the access address of the second client specifically in the following manner: the second client transmits the access address of the second client to the first client through the agent server after determining the access address of the second client; and the first client acquires, through the agent server, the access address of the second client transmitted by the second client to the first client, adds the access address of the second client to the connection test packet, and transmits the connection test packet added with the access address of the second client to the first gateway.

Since the access address of the second client is determined by the second client using the network traversal protocol, providing the access address of the second client for the first gateway for storage by containing in the connection test packet lays a foundation for subsequent establishment of the communication connection between the first client and the second client.

S202: Store the access address of the second client contained in the connection test packet.

S203: Receive a connection data packet transmitted by the first client to the second client.

S204: Check whether a first address storage notification message transmitted by the second gateway is already received.

S205: Transmit the received connection data packet to the second client through the second gateway when a checking result is YES, so as to establish a communication connection between the first client and the second client according to the connection data packet.

The first address storage notification message is transmitted by the second gateway after storing the access address of the first client.

In S202 to S205, since a packet header file of the connection test packet records source address information and destination address information corresponding to the connection test packet, the first gateway may determine the access address of the second client based on the record in the packet header file after receiving the connection test packet transmitted by the first client. The first gateway and the first client may belong to the same terminal device. Alternatively, the first gateway may be an independent device independent of a terminal device that the first client belongs to. In this embodiment of the present disclosure, a relationship between devices that the first gateway and the first client belong to is not limited. In an embodiment, the first gateway may not continue to forward the connection test packet after determining the access address of the second client. That is, transmission of the connection test packet from the first client is stopped at the first gateway. Since the second gateway does not store the access address of the first client, if the first gateway continues to forward the connection test packet to the second gateway, the second gateway determines the connection test packet from the first client as a strange connection test packet, and blacklists the access address of the first client. In order to avoid the second gateway blacklisting the access address of the first client and enable the first gateway to store the access address of the second client, the first gateway may set a target route count for the connection test packet, to ensure that the connection test packet is stopped to be forwarded when arriving just at the first gateway from the first client.

Figure 3A:
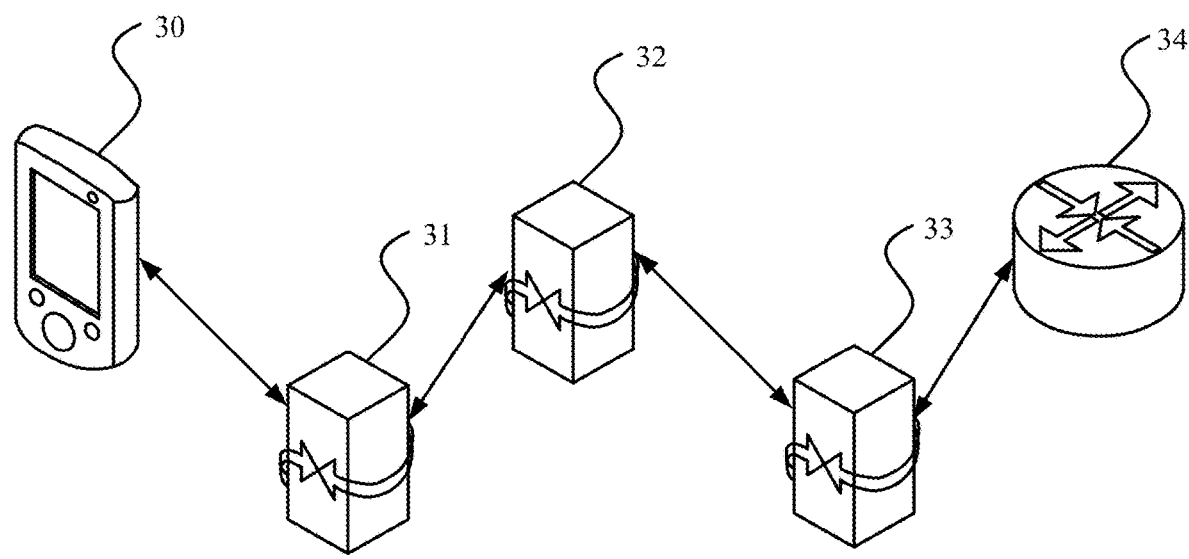
FIG. 3a is a schematic diagram of connection between a client and multiple gateways according to an embodiment of the present disclosure.

In an embodiment, the target route count is used for indicating a number of intranet gateways that the connection test packet passes through from the first client to the first gateway. A minus one process is executed on the target route count when the connection test packet arrives at an intranet gateway, and the connection data packet is stopped to be forwarded when the target route count subjected to the minus one process is 0. As shown in FIG. 3a, the first client is a client marked as 30 in FIG. 3a, and the first gateway is a gateway marked as 34 in FIG. 3a. In FIG. 3a, gateways marked as 31, 32, and 33 are all intranet gateways. In such case, the first client 30 may first determine, when transmitting a connection test packet to the first gateway 34, a number of intranet gateways that the connection test packet needs to pass through. If the number of intranet gateways that the connection test packet needs to pass through is 3, a target route count set by the first client 30 for the connection test packet is 4, such that the first client 30 may transmit the connection test packet just to the first gateway 34. After the first gateway 34 receives the connection test packet, the target route count is reduced to 0. Then, the first gateway may determine the access address of the second gateway based on a packet header file of the connection test packet after receiving the connection test packet, and directly drops the connection test packet after storing the access address of the second gateway.

In an embodiment, if receiving, after storing the access address of the second client, a connection data packet transmitted by the first client to the second client for instructing establishment of a communication connection therebetween, the first gateway may first determine whether the second gateway already stores the access address of the first client. The first gateway may acquire a first address storage notification message transmitted by the second gateway to determine whether the second gateway already stores the access address of the first client. In an embodiment, the first gateway may determine, if receiving the first address storage notification message transmitted by the second gateway, that the second gateway already stores the access address of the first client, and determine, if not receiving the first address storage notification message transmitted by the second gateway, that the second gateway does not store the access address of the first client. The first address storage notification message is transmitted by the second gateway after storing the access address of the first client. The first gateway may transmit the acquired connection data packet to the second client through the second gateway if determining that the first address storage notification message transmitted by the second gateway is received, so as to establish the communication connection between the first client and the second client based on the connection data packet.

When the communication connection is established between the first client and the second client based on the connection data packet, after the first gateway transmits the connection data packet to the second client through the second gateway, the second client may transmit confirmation information indicating that the connection data packet is received to the first client after determining that the connection data packet is received. Hereto, the communication connection between the first client and the second client is completed. Alternatively, the second gateway may initiate establishment of the communication connection between the first client and the second client. That is, the second gateway receives a notification message indicating that the first gateway already stores the access address of the second client from the first gateway after storing the access address of the first client, and further transmit a connection data packet for instructing establishment of the communication connection between the first client and the second client to the first client, so as to establish the communication connection between the first client and the second client based on the connection data packet.

In one embodiment, the first gateway may also transmit a second address storage notification message to the second gateway after storing the access address of the second client, the second address storage notification message being used for identifying that the first gateway stores the access address of the second client. Therefore, when the second client needs to establish the communication connection with the first client, the second gateway may determine, based on the acquired second address storage notification message, whether the first gateway successfully stores the access address of the second client. Therefore, the success rate of establishing the communication connection between the first client and the second client is improved.

In this embodiment of the present disclosure, the first gateway may receive, when determining that it is necessary to establish a communication connection between the first client and the second client, a connection test packet transmitted by the first client, so as to obtain an access address of the second client based on a packet header file of the connection test packet and store the access address of the second client. Further, the first gateway may transmit, to the second client through the second gateway when determining that the second gateway already stores an access address of the first client, a connection data packet transmitted by the first client to the second client, so as to establish the communication connection between the first client and the second client based on the connection data packet. Since the first gateway and the second gateway already prestore the access addresses of the correspondent clients, the connection data packet may be forwarded smoothly through the first gateway and the second gateway, and further, the communication connection may be established between the first client and the second client. Since the probability that the connection data packet is dropped by the first gateway or the second gateway is relatively low, the success rate of establishing the communication connection between the first client and the second client may be improved.

Figure 3B:
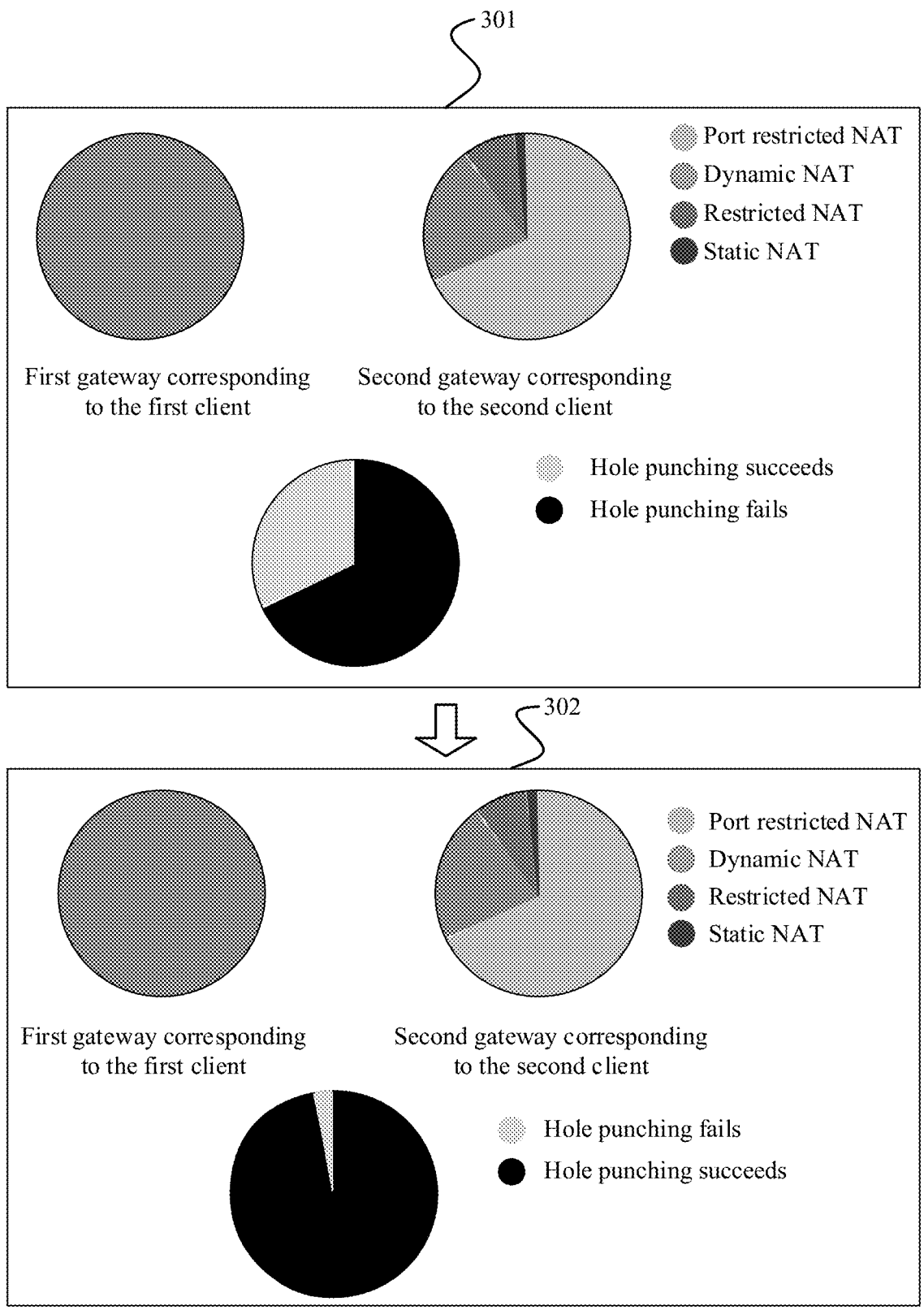
FIG. 3b is a comparison diagram of hole punching success rates according to an embodiment of the present disclosure.
Figure 3C:
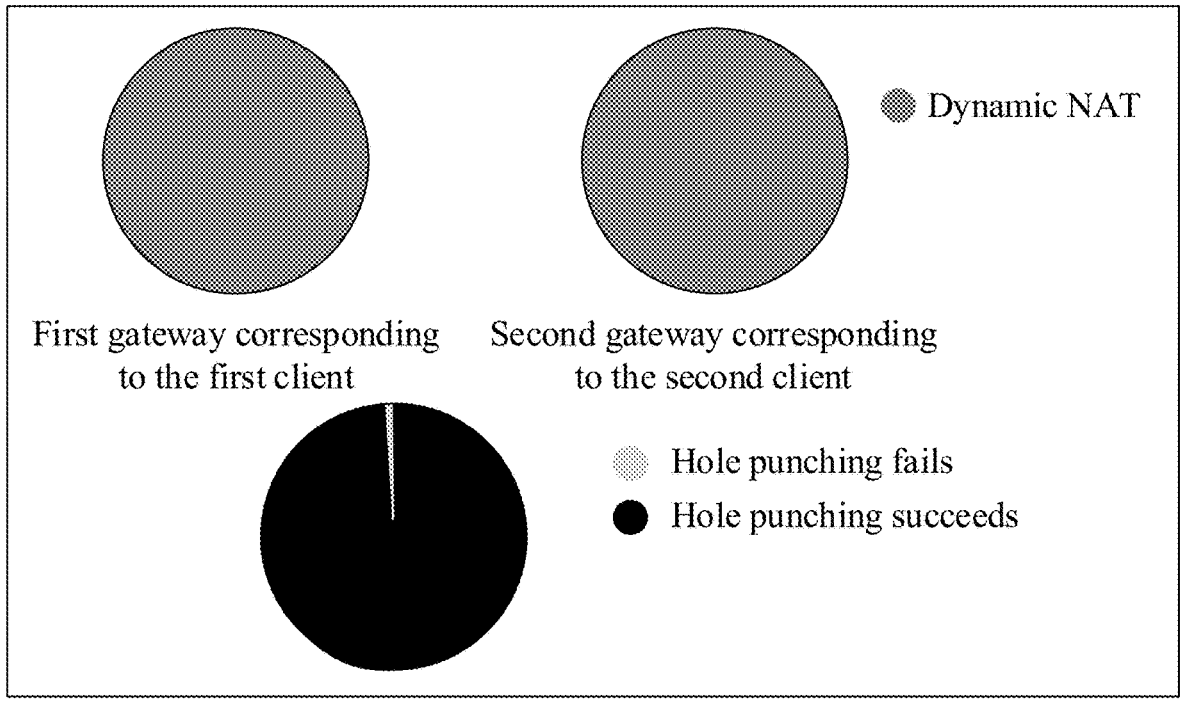
FIG. 3c is a schematic diagram of a hole punching success rate according to an embodiment of the present disclosure.

In an embodiment, the data processing method disclosed in this embodiment of the present disclosure to establish the communication connection between the first client and the second client is compared with a method in the related art for establishing the communication connection between the first client and the second client. As shown in FIG. 3b, if the related art is used to establish the communication connection between the first client and the second client, a test result marked as 301 in FIG. 3b shows that the probability of successfully establishing the communication connection between the first client and the second client is only 33%. However, the probability of successfully establishing the communication connection between the first client and the second client using the method disclosed in this embodiment of the present disclosure is 94%. It can thus be seen that, by the data processing method disclosed in this embodiment of the present disclosure, the success rate of establishing the communication connection between the first client and the second client may be improved effectively. In addition, as shown in FIG. 3c, the data processing method disclosed in this embodiment of the present disclosure may also be applied to the establishment of the communication connection between the first client and the second client when the gateways corresponding to the first client and the second client are both deployed with dynamic NAT, and the probability of successfully establishing the communication connection is 99%. It can thus be seen that, by the data processing method disclosed in this embodiment of the present disclosure, the success rate of establishing the communication connection between the first client and the second client may be improved effectively.

Figure 4:
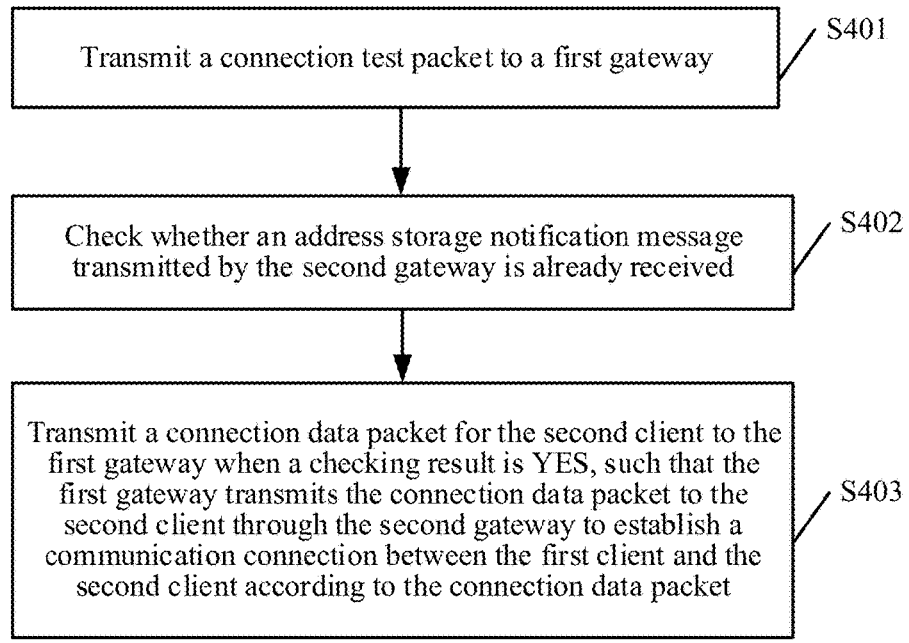
FIG. 4 is a schematic flowchart of a data processing method according to an embodiment of the present disclosure.

Referring to FIG. 4, FIG. 4 is a schematic flowchart of a data processing method according to an embodiment of the present disclosure. The method may be applied to a terminal device installed with the above-mentioned first client. As shown in FIG. 4, the method may include the following steps:

S401: Transmit a connection test packet to a first gateway, the connection test packet containing an access address of a second client, such that the first gateway stores the access address of the second client according to the connection test packet.

In an embodiment, a first client may acquire an access address of a second client through an agent server when transmitting a connection test packet to a first gateway. The access address of the second client is determined and transmitted to the agent server using a network traversal protocol. After acquiring the access address of the second client, the first client may add the access address of the second client to the connection test packet, and transmit the connection test packet added with the access address of the second client to the first gateway. The first client belongs to a first private network. The second client belongs to a second private network. The first private network is provided with the first gateway. The second private network is provided with a second gateway. It can be understood that the first client establishes a communication connection with a public network through the first gateway, and the second client establishes a communication connection with the public network through the second gateway. Since the access address of the second client is determined by the second client using the network traversal protocol, providing the access address of the second client for the first gateway for storage by containing in the connection test packet lays a foundation for subsequent establishment of a communication connection between the first client and the second client.

Similarly, when it is necessary to establish a communication connection between the first client and the second client, the second client also transmit a connection test packet containing an access address of the first client to the second gateway, such that the second gateway determines and stores the access address of the first client based on the connection test packet. Therefore, both the first gateway and the second gateway store the access addresses of the correspondent clients.

In order to avoid the second gateway blacklisting the access address of the first client and enable the first gateway to store the access address of the second client, the first gateway may set a target route count for the connection test packet, to ensure that the connection test packet is stopped to be forwarded when arriving just at the first gateway from the first client. In an embodiment, the first client may first determine, when transmitting the connection test packet to the first gateway, a target route count for indicating a number of intranet gateways that the connection test packet passes through from the first client to the first gateway. The first client may add the target route count to the connection test packet after determining the target route count. During transmission of the connection test packet to the first gateway, a minus one process is executed on the target route count when the connection test packet arrives at an intranet gateway, and the connection test packet arrives at the first gateway when the target route count subjected to the minus one process reaches a target value. The target value may be, for example, 0.

Any data packet passes through at least one intranet gateway from the first client to the first gateway corresponding to the first client. When the target route count is set for the connection test packet, the first client may set an initial route count for a connection request packet, and transmit the connection request packet to a target gateway according to the initial route count, the connection request packet being a data packet. Further, the first client may acquire a gateway address of the target gateway from the target gateway, and determine whether the gateway address is the access address of the first client. The initial route count is determined as the target route count in response to determining that the gateway address is the access address of the first client. In an embodiment, a plus one process is executed the initial route count when the first client determines that the gateway address is not the access address of the first client. The connection request packet is forwarded according to the initial route count subjected to the plus one process until the access address of the first client is acquired. A target count of the plus one process executed to acquire the access address of the first client is determined. The initial route count is updated according to the target count, and the updated initial route count is determined as the target route count. As such, the target route count is determined accurately.

Figure 5:
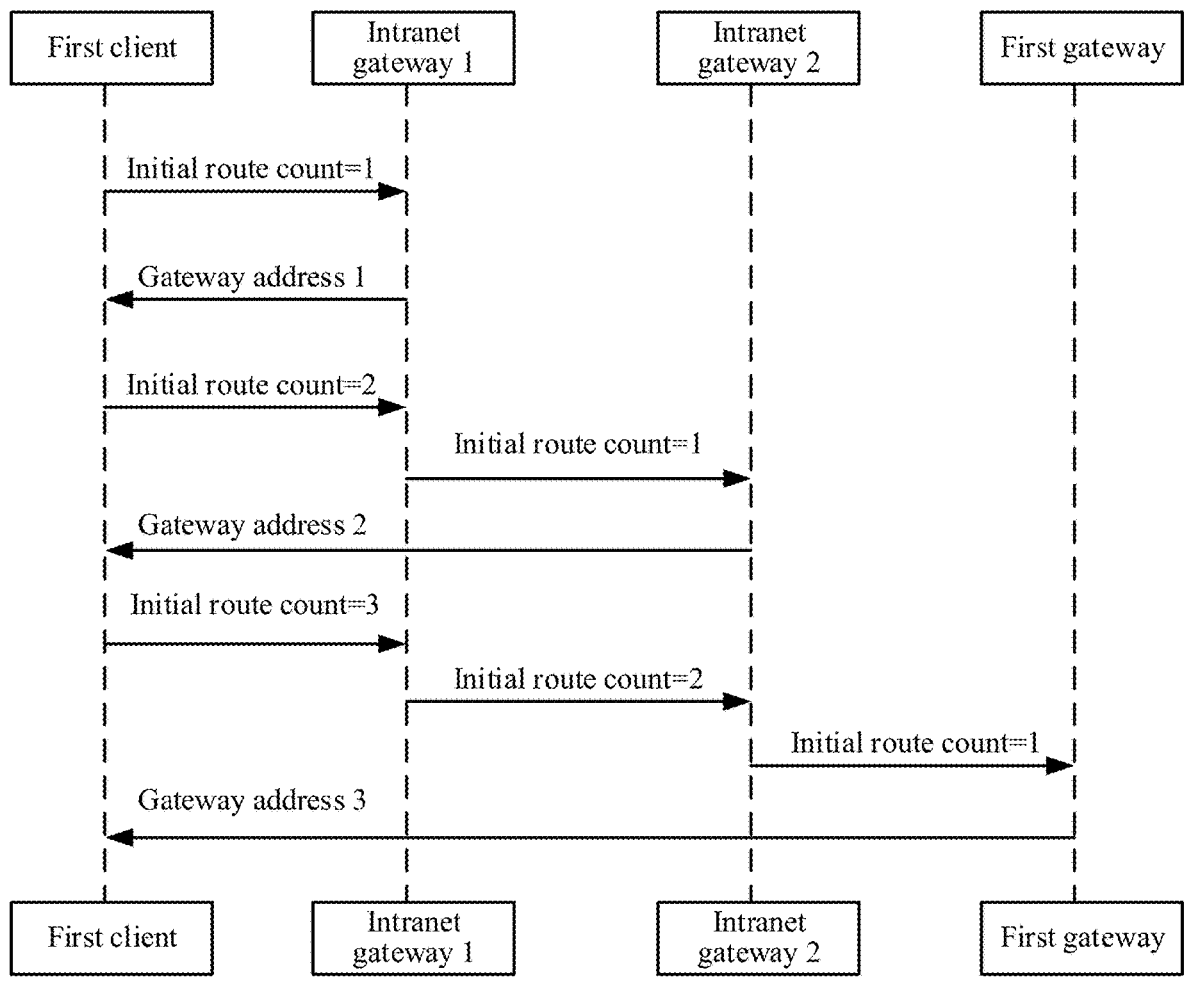
FIG. 5 is a schematic diagram of determining a target route count by a first client according to an embodiment of the present disclosure.

Specifically, as shown in FIG. 5, the first client sets an initial route count for the connection request packet first to indicate time to live (TTL) of the connection request packet. If the initial route count set for the connection request packet is 1, namely TTL=1, the connection request packet may only arrive at an intranet gateway 1 from the first client. Correspondingly, the first client may acquire a gateway address 1 of the intranet gateway 1 from the intranet gateway 1. The gateway address 1 is fed back to the first client by the intranet gateway 1 after determining that the connection request packet is received. The first client may match the gateway address 1 and the access address of the first client after acquiring the gateway address 1. Since the gateway address 1 is different from the access address of the first client, the first client is unable to transmit, when determining that the target route count is 1, the connection request packet to the first gateway connected with the public network. A plus one process is further executed on the initial route count, and at this point, the initial route count is 2, namely TTL=2. Then, a minus one process is performed on the initial route count (i.e., TTL) every time when the connection request packet from the first client passes through an intranet gateway. It can be seen that, in case of TTL=2, the first client may transmit the connection request packet to an intranet gateway 2, and acquire a gateway address 2 fed back by the intranet gateway 2. Since the first client determines that the gateway address 2 is also not the access address of the first client, the plus one process is further performed on the initial route count, and at this point, the initial route count is 3, namely TTL=3. In case of TTL=3, the first client may transmit the connection request packet to the first gateway, and acquire a gateway address 3 of the first gateway fed back by the first gateway. Since the gateway address 3 of the first gateway is the access address of the first client, TTL=3 is a target count, and the first client determines that the target route count for arrival at the first gateway corresponding to the first client is 3.

S402: Check whether an address storage notification message transmitted by the second gateway is already received.

S403: Transmit a connection data packet for the second client to the first gateway when a checking result is YES, such that the first gateway transmits the connection data packet to the second client through the second gateway to establish a communication connection between the first client and the second client according to the connection data packet.

The address storage notification message is transmitted by the second gateway after storing the access address of the first client.

In an embodiment, after the first client transmits the connection test packet to the first gateway such that the first gateway stores the access address of the second client, the first client may determine, based on whether an address storage notification message transmitted by the second gateway is received, whether the second gateway stores the access address of the first client. The address storage notification message is transmitted by the second gateway after storing the access address of the first client. If determining that the address storage notification message transmitted by the second gateway is received, the first client may transmit the connection data packet to be transmitted to the second client to the first gateway, such that the first gateway forwards the connection data packet to the second gateway and the second client finally receives the connection data packet. Therefore, the communication connection is established between the first client and the second client based on the connection data packet.

In this embodiment of the present disclosure, the first client may transmit a connection test packet containing an access address of the second client to the first gateway when it is necessary to establish a communication connection between the first client and the second client, such that the first gateway acquires an access address of the second client from the connection test packet and stores the access address of the second client, to implement storage of the access address of the second client in the first gateway. Further, the first client may transmit a connection data packet to the second client through the first gateway and the second gateway if determining that the second gateway already stores an access address of the first client, such that the connection data packet may arrive at the second client smoothly through the first gateway and the second gateway. Therefore, the communication connection is established between the first client and the second client based on the connection data packet, and the success rate of establishing the communication connection between the first client and the second client is improved.

Figure 6:
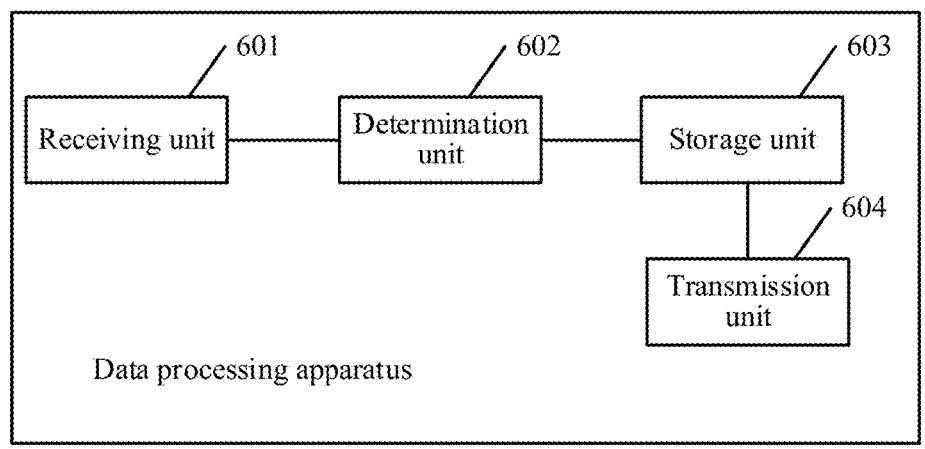
FIG. 6 is a schematic block diagram of a data processing apparatus according to an embodiment of the present disclosure.

Based on the foregoing description of the embodiment of the data processing method, an embodiment of the present disclosure also discloses a data processing apparatus. The data processing apparatus may be a computer program (including program code) running in the above-mentioned first gateway. The data processing apparatus may be configured to execute the data processing method shown in FIG. 2. Referring to FIG. 6, the data processing apparatus includes a receiving unit 601, a determination unit 602, a storage unit 603, and a transmission unit 604.

The receiving unit 601 is configured to receive a connection test packet transmitted by a first client, the connection test packet containing an access address of a second client, the first client belonging to a first private network, the second client belonging to a second private network, the first private network being provided with the first gateway, and the second private network being provided with a second gateway.

The determination unit 602 is configured to determine the access address of the second client contained in the connection test packet.

The storage unit 603 is configured to store the access address of the second client.

The receiving unit 601 is further configured to receive a connection data packet transmitted by the first client to the second client.

The determination unit 602 is further configured to check whether a first address storage notification message transmitted by the second gateway is already received, the first address storage notification message being transmitted by the second gateway after storing an access address of the first client.

The transmission unit 604 is configured to transmit the received connection data packet to the second client through the second gateway when the determination unit 602 determines that the first address storage notification message is already received, so as to establish a communication connection between the first client and the second client according to the connection data packet.

In an embodiment, the access address of the second client is determined using a network traversal protocol. The receiving unit is further configured to acquire, through an agent server before receiving the connection test packet transmitted by the first client, the access address of the second client transmitted by the second client to the first client.

In an embodiment, both the first gateway and the second gateway are extranet gateways.

Each extranet gateway is deployed with a network address translation protocol, the network address translation protocol being used for translating a client address of a client for private network access into an access address for public network access.

The first gateway translates a client address of the first client for access to the first private network into the access address of the first client when the first client accesses a public network. A client address of the second client for access to the second private network is translated into the access address of the second client when the second client accesses the public network.

In an embodiment, the determination unit 602 is further configured to determine a first protocol type of the network address translation protocol in the first gateway and a second protocol type of the network address translation protocol in the second gateway.

The receiving unit 601 is further configured to trigger, when both the first protocol type and the second protocol type are dynamic types, the receiving unit to execute the operation of receiving a connection test packet transmitted by a first client.

In an embodiment, a target route count is set for the connection test packet, the target route count being used for indicating a number of intranet gateways that the connection test packet passes through from the first client to the first gateway.

In this embodiment of the present disclosure, the receiving unit 601 may receive, when determining that it is necessary to establish a communication connection between the first client and the second client, a connection test packet transmitted by the first client, such that the determination unit 602 obtains an access address of the second client based on a packet header file of the connection test packet, and the storage unit 603 stores the access address of the second client. Further, the transmission unit 604 may transmit, to the second client through the second gateway when the determination unit 602 determines that the second gateway already stores an access address of the first client, a connection data packet transmitted by the first client to the second client, so as to establish the communication connection between the first client and the second client based on the connection data packet. Since the first gateway and the second gateway already prestore the access addresses of the correspondent clients, the connection data packet may be forwarded smoothly through the first gateway and the second gateway, and further, the communication connection may be established between the first client and the second client. Since the probability that the connection data packet is dropped by the first gateway or the second gateway is relatively low, the success rate of establishing the communication connection between the first client and the second client may be improved.

Figure 7:
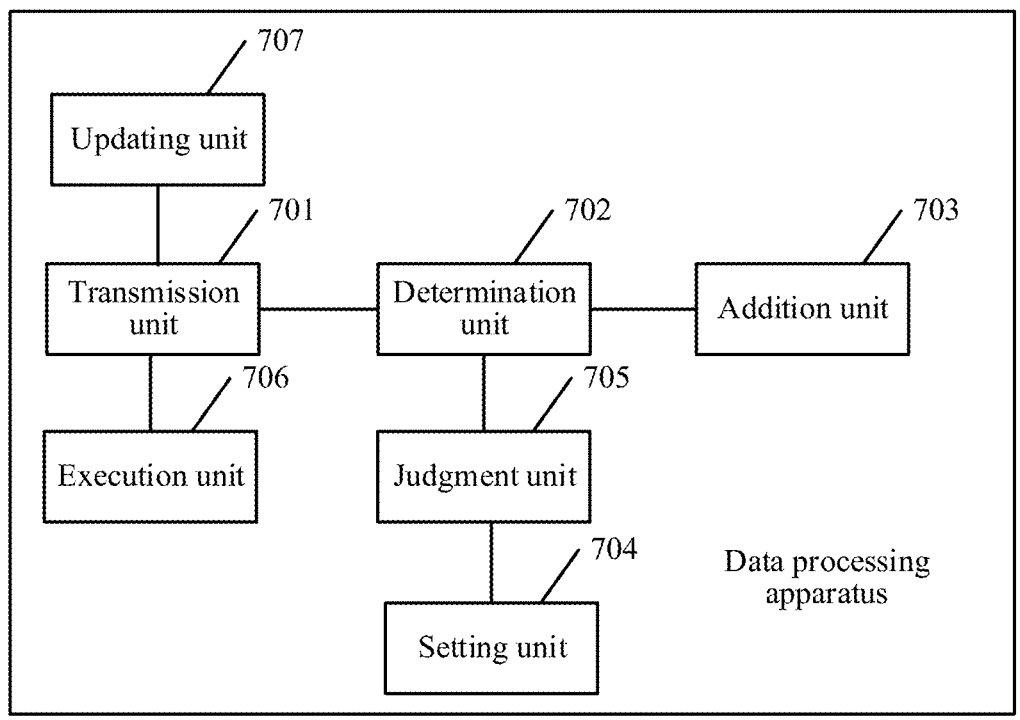
FIG. 7 is a schematic block diagram of a data processing apparatus according to an embodiment of the present disclosure.

Based on the foregoing description of the embodiment of the data processing method, an embodiment of the present disclosure also discloses a data processing apparatus. The data processing apparatus, configured in the above-mentioned terminal device, may be a computer program (including program code) running in the above-mentioned first client. The data processing apparatus may be configured to execute the data processing method shown in FIG. 4. Referring to FIG. 7, the data processing apparatus includes a transmission unit 701 and a determination unit 702.

The transmission unit 701 is configured to transmit a connection test packet to a first gateway, the connection test packet containing an access address of a second client, such that the first gateway stores the access address of the second client according to the connection test packet, a first client belonging to a first private network, the second client belonging to a second private network, the first private network being provided with the first gateway, and the second private network being provided with a second gateway.

The determination unit 702 is configured to check whether an address storage notification message transmitted by the second gateway is already received, the address storage notification message being transmitted by the second gateway after storing an access address of the first client.

The transmission unit 701 is further configured to transmit a connection data packet for the second client to the first gateway when the determination unit 702 determines that the address storage notification message is already received, such that the first gateway transmits the connection data packet to the second client through the second gateway to establish a communication connection between the first client and the second client according to the connection data packet.

In an embodiment, the transmission unit 701 is specifically configured to:

acquire, through an agent server, the access address of the second client, the access address of the second client being determined and transmitted to the agent server using a network traversal protocol;

add the access address of the second client to the connection test packet; and transmit the connection test packet added with the access address of the second client to the first gateway.

In an embodiment, the apparatus further includes a determining unit 702 and an addition unit 703.

The determination unit 702 is configured to determine a target route count, the target route count being used for indicating a number of intranet gateways that the connection test packet passes through from the first client to the first gateway.

The addition unit 703 is configured to add the target route count to the connection test packet, where during transmission of the connection test packet by the transmission unit 701 to the first gateway, a minus one process is executed on the target route count when the connection test packet arrives at an intranet gateway, and the connection test packet arrives at the first gateway when the target route count subjected to the minus one process reaches a target value.

In an embodiment, any data packet passes through at least one intranet gateway from the first client to the first gateway corresponding to the first client. The apparatus further includes a setting unit 704 and a judgment unit 705.

The setting unit 704 is configured to set an initial route count for a connection request packet.

The transmission unit 701 is further configured to transmit the connection request packet to a target gateway of the first private network according to the initial route count, the connection request packet being a data packet.

The judgment unit 705 is configured to determine whether a gateway address of the target gateway acquired from the target gateway is the access address of the first client.

The determination unit 702 is further configured to determine the initial route count as the target route count in response to determining that the gateway address is the access address of the first client.

In an embodiment, the apparatus further includes an execution unit 706 and an updating unit 707.

The execution unit 706 is configured to execute a plus one process on the initial route count in response to determining that the gateway address is not the access address of the first client.

The transmission unit 701 is further configured to forward the connection request packet in the first private network according to the initial route count subjected to the plus one process until the access address of the first client is acquired.

The determination unit 702 is further configured to determine a target count of the plus one process executed to acquire the access address of the first client.

The updating unit 707 is configured to update the initial route count according to the target count, and determine the updated initial route count as the target route count.

In this embodiment of the present disclosure, the transmission unit 701 may transmit a connection test packet containing an access address of the second client to the first gateway when it is necessary to establish a communication connection between the first client and the second client, such that the first gateway acquires an access address of the second client from the connection test packet and stores the access address of the second client, to implement storage of the access address of the second client in the first gateway. Further, the transmission unit 701 may transmit a connection data packet to the second client through the first gateway and the second gateway if it is determined that the second gateway already stores an access address of the first client, such that the connection data packet may arrive at the second client smoothly through the first gateway and the second gateway. Therefore, the communication connection is established between the first client and the second client based on the connection data packet, and the success rate of establishing the communication connection between the first client and the second client is improved.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Figure 8:
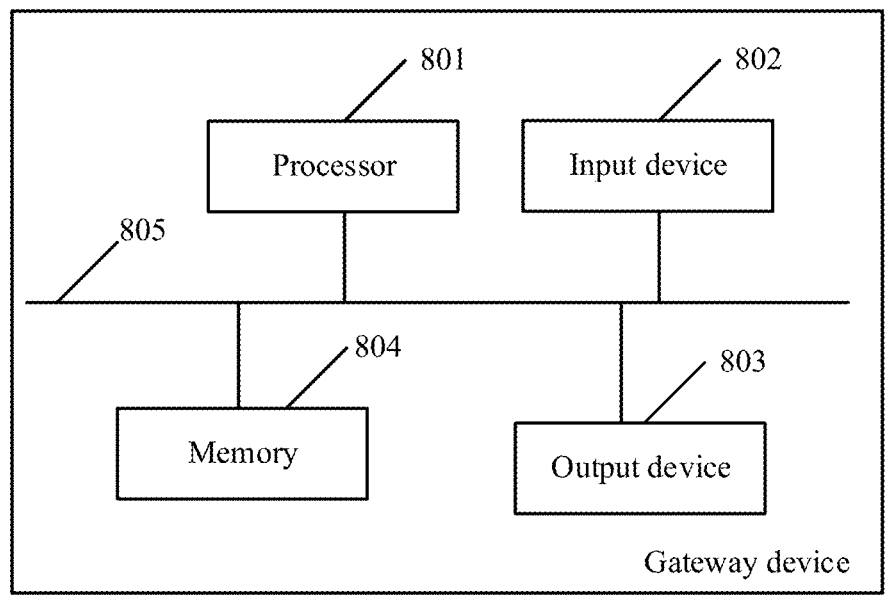
FIG. 8 is a schematic block diagram of a gateway device according to an embodiment of the present disclosure.

Referring to FIG. 8, FIG. 8 is a schematic structural block diagram of a gateway device according to an embodiment of the present disclosure. The gateway device is the above-mentioned first gateway. The gateway device may be a server. The server may be an independent physical server, or a server cluster including multiple physical servers or a distributed system, or a cloud server that provides basic cloud computing service, such as cloud service, a cloud database, cloud computing, a cloud function, cloud storage, network service, cloud communication, middleware service, domain name service, security service, a content delivery network (CDN), and a big data and artificial intelligence platform. The terminal may be a smartphone, a tablet computer, a notebook computer, a desktop computer, a smart speaker, a smartwatch, or the like, but is not limited thereto. Alternatively, the gateway device may be a terminal device.

As shown in FIG. 8, the gateway device in this embodiment may include: one or more processors 801, one or more an input devices 802, one or more output devices 803, and a memory 804. The processor 801, the input device 802, the output device 803, and the memory 804 are connected through a bus 805. The memory 804 is configured to store a computer program, and the computer program includes program instructions. The processor 801 is configured to execute the program instructions stored in the memory 804.

The memory 804 may include a volatile memory such as a random-access memory (RAM). The memory 804 may also include a non-volatile memory such as a flash memory or a solid-state drive (SSD). The memory 804 may alternatively include a combination of the foregoing types of memories.

The processor 801 may be a central processing unit (CPU). The processor 801 may further include a hardware chip. The foregoing hardware chip may be an application-specific integrated circuit (ASIC), a programmable logic device (PLD), or the like. The PLD may be a field programmable gate array (FPGA), generic array logic (GAL), or the like. The processor 801 may alternatively be a combination of the foregoing structures.

In this embodiment of the present disclosure, the memory 804 is configured to store a computer program, and the computer program includes program instructions. The processor 801 is configured to execute the program instructions stored in the memory 804, to perform the steps of the corresponding method shown in FIG. 1.

In an embodiment, the processor 801 is configured to call the program instructions to execute the following operations:

receiving a connection test packet transmitted by a first client, the connection test packet containing an access address of a second client, the first client belonging to a first private network, the second client belonging to a second private network, the first private network being provided with a first gateway, and the second private network being provided with a second gateway;

storing the access address of the second client contained in the connection test packet; and transmitting, when a first address storage notification message transmitted by the second gateway is already received while receiving a connection data packet transmitted by the first client to the second client, the connection data packet to the second client through the second gateway, so as to establish a communication connection between the first client and the second client according to the connection data packet, the first address storage notification message being transmitted by the second gateway after storing an access address of the first client.

Figure 9:
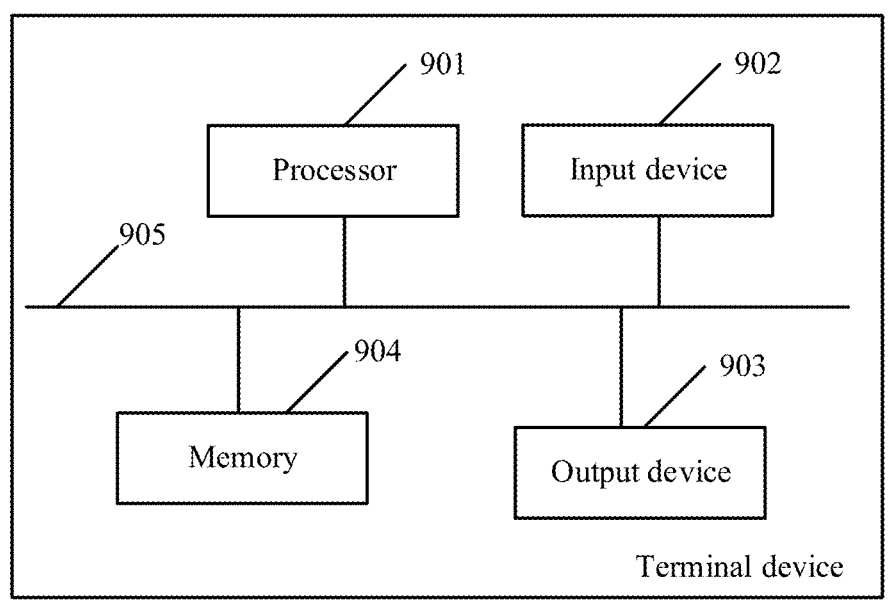
FIG. 9 is a schematic block diagram of a terminal device according to an embodiment of the present disclosure.

Referring to FIG. 9, FIG. 9 is a schematic structural block diagram of a terminal device according to an embodiment of the present disclosure. As shown in FIG. 9, the terminal device in this embodiment may include: one or more processors 901, one or more input devices 902, one or more output devices 903, and a memory 904. The processor 901, the input device 902, the output device 903, and the memory 904 are connected through a bus 905. The memory 904 is configured to store a computer program, and the computer program includes program instructions. The processor 901 is configured to execute the program instructions stored in the memory 904.

The memory 904 may include a volatile memory such as a random-access memory (RAM). The memory 904 may also include a non-volatile memory such as a flash memory or a solid-state drive (SSD). The memory 904 may alternatively include a combination of the foregoing types of memories.

The processor 901 may be a central processing unit (CPU). The processor 901 may further include a hardware chip. The foregoing hardware chip may be an application-specific integrated circuit (ASIC), a programmable logic device (PLD), or the like. The PLD may be a field programmable gate array (FPGA), generic array logic (GAL), or the like. The processor 901 may alternatively be a combination of the foregoing structures.

In this embodiment of the present disclosure, the memory 904 is configured to store a computer program, and the computer program includes program instructions. The processor 901 is configured to execute the program instructions stored in the memory 904, to implement the steps of the corresponding method shown in FIG. 4.

In an embodiment, the processor 901 is configured to call the program instructions to execute the following operations:

transmitting a connection test packet to a first gateway, the connection test packet containing an access address of a second client, such that the first gateway stores the access address of the second client according to the connection test packet, a first client belonging to a first private network, the second client belonging to a second private network, the first private network being provided with the first gateway, and the second private network being provided with a second gateway; and transmitting, to the first gateway when an address storage notification message transmitted by the second gateway is already received, a connection data packet transmitted to the second client, such that the first gateway transmits the connection data packet to the second client through the second gateway to establish a communication connection between the first client and the second client according to the connection data packet, the address storage notification message being transmitted by the second gateway after storing the access address of the first client.

An embodiment of the present disclosure provides a computer program product or a computer program. The computer program product or the computer program includes a computer program, and the computer program is stored in a computer-readable storage medium. A processor of a computer device reads the computer program from the computer-readable storage medium, and the processor executes the computer program, to cause the computer device to implement the method embodiment shown in FIG. 2 or FIG. 4. The computer readable storage medium may be a magnetic disk, an optical disc, a read-only memory (Read-Only Memory, ROM), a random access memory (Random Access Memory, RAM), or the like.

An embodiment of the present disclosure further provides a computer program product including instructions, the instructions, when run on a computer, causing the computer to perform the method according to the foregoing embodiments.

The foregoing descriptions are merely some embodiments of the present disclosure, and are not intended to limit the scope of the present disclosure. A person skilled in the art may understand all or some processes of the foregoing embodiments, and equivalent modifications made according to the claims of the present disclosure shall still fall within the scope of the present disclosure.

What is claimed is:

1. A data processing method, executed by a first gateway and comprising:

receiving a connection test packet transmitted by a first client, the connection test packet containing an access address of a second client, the first client belonging to a first private network with the first gateway, the second client belonging to a second private network with a second gateway;

storing the access address of the second client contained in the connection test packet;

receiving a connection data packet transmitted by the first client to the second client;

checking whether a first address storage notification message transmitted by the second gateway is received, the first address storage notification message being transmitted by the second gateway after storing an access address of the first client; and in response to determining that the first address storage notification message is received, transmitting the connection data packet to the second client through the second gateway, the connection data packet being used to establish a communication connection between the first client and the second client.

2. The method according to claim 1, wherein the access address of the second client is determined using a network traversal protocol; and the method further comprises:

acquiring, through an agent server, the access address of the second client transmitted by the second client to the first client.

3. The method according to claim 1, further comprising:

transmitting a second address storage notification message to the second gateway, the second address storage notification message being used for identifying that the first gateway stores the access address of the second client.

4. The method according to claim 1, wherein both the first gateway and the second gateway are extranet gateways;

each extranet gateway is deployed with a network address translation protocol, the network address translation protocol being used for translating a client address of a client for private network access into an access address for public network access;

the first gateway translates a client address of the first client for access to the first private network into the access address of the first client when the first client accesses a public network;

and a client address of the second client for access to the second private network is translated into the access address of the second client when the second client accesses the public network.

5. The method according to claim 4, further comprising:

determining a first protocol type of the network address translation protocol in the first gateway and a second protocol type of the network address translation protocol in the second gateway; and triggering the operation of receiving a connection test packet transmitted by a first client to be executed when both the first protocol type and the second protocol type are dynamic types.

6. The method according to claim 1, wherein a target route count is set for the connection test packet, the target route count being used for indicating a number of intranet gateways that the connection test packet passes through from the first client to the first gateway.

7. The method according to claim 6, wherein: the target route count is decreased by one each time when the connection test packet arrives at an intranet gateway, and the connection data packet is stopped to be forwarded when the target route count reaches 0.

8. The method according to claim 1, wherein:

the access address of the second client is stored in a packet header file of the connection test packet.

9. A gateway device, comprising a processor, and a memory, the memory being configured to store a computer program the processor being configured to execute the computer program to perform:

receiving a connection test packet transmitted by a first client, the connection test packet containing an access address of a second client, the first client belonging to a first private network with a first gateway, the second client belonging to a second private network with a second gateway;

storing the access address of the second client contained in the connection test packet;

receiving a connection data packet transmitted by the first client to the second client;

checking whether a first address storage notification message transmitted by the second gateway is received, the first address storage notification message being transmitted by the second gateway after storing an access address of the first client; and in response to determining that the first address storage notification message is received, transmitting the connection data packet to the second client through the second gateway, the connection data packet being used to establish a communication connection between the first client and the second client.

10. The device according to claim 9, wherein the access address of the second client is determined using a network traversal protocol; and the processor is further configured to perform:

acquiring, through an agent server, the access address of the second client transmitted by the second client to the first client.

11. The device according to claim 9, wherein the processor is further configured to perform:

transmitting a second address storage notification message to the second gateway, the second address storage notification message being used for identifying that the first gateway stores the access address of the second client.

12. The device according to claim 9, wherein both the first gateway and the second gateway are extranet gateways;

each extranet gateway is deployed with a network address translation protocol, the network address translation protocol being used for translating a client address of a client for private network access into an access address for public network access;

the first gateway translates a client address of the first client for access to the first private network into the access address of the first client when the first client accesses a public network;

and a client address of the second client for access to the second private network is translated into the access address of the second client when the second client accesses the public network.

13. The device according to claim 12, wherein the processor is further configured to perform:

determining a first protocol type of the network address translation protocol in the first gateway and a second protocol type of the network address translation protocol in the second gateway; and triggering the operation of receiving a connection test packet transmitted by a first client to be executed when both the first protocol type and the second protocol type are dynamic types.

14. The device according to claim 9, wherein a target route count is set for the connection test packet, the target route count being used for indicating a number of intranet gateways that the connection test packet passes through from the first client to the first gateway.

15. The device according to claim 14, wherein: the target route count is decreased by one each time when the connection test packet arrives at an intranet gateway, and the connection data packet is stopped to be forwarded when the target route count reaches 0.

16. A non-transitory storage medium storing a computer program, the computer program, when being executed by at least one processor of a first gateway, causing the at least one processor to perform:
receiving a connection test packet transmitted by a first client, the connection test packet containing an access address of a second client, the first client belonging to a first private network with the first gateway, the second client belonging to a second private network with a second gateway;
storing the access address of the second client contained in the connection test packet;
receiving a connection data packet transmitted by the first client to the second client;
checking whether a first address storage notification message transmitted by the second gateway is received, the first address storage notification message being transmitted by the second gateway after storing an access address of the first client; and
in response to determining that the first address storage notification message is received, transmitting the connection data packet to the second client through the second gateway, the connection data packet being used to establish a communication connection between the first client and the second client.

17. The storage medium according to claim 16, wherein the access address of the second client is determined using a network traversal protocol; and the computer program further causes the at least one processor to perform:
acquiring, through an agent server, the access address of the second client transmitted by the second client to the first client.

18. The storage medium according to claim 16, wherein the computer program further causes the at least one processor to perform:
transmitting a second address storage notification message to the second gateway, the second address storage notification message being used for identifying that the first gateway stores the access address of the second client.

19. The storage medium according to claim 16, wherein both the first gateway and the second gateway are extranet gateways;
each extranet gateway is deployed with a network address translation protocol, the network address translation protocol being used for translating a client address of a client for private network access into an access address for public network access;
the first gateway translates a client address of the first client for access to the first private network into the access address of the first client when the first client accesses a public network;
and a client address of the second client for access to the second private network is translated into the access address of the second client when the second client accesses the public network.

20. The storage medium according to claim 19, wherein the computer program further causes the at least one processor to perform:
determining a first protocol type of the network address translation protocol in the first gateway and a second protocol type of the network address translation protocol in the second gateway; and
triggering the operation of receiving a connection test packet transmitted by a first client to be executed when both the first protocol type and the second protocol type are dynamic types.

* * * * *